(12) United States Patent
Ding et al.

(10) Patent No.: US 10,684,720 B2
(45) Date of Patent: Jun. 16, 2020

(54) TOUCH DISPLAY PANEL, TOUCH DISPLAY DEVICE AND DRIVE METHOD

(71) Applicant: SHANGHAI TIANMA MICRO-ELECTRONICS CO., LTD., Shanghai (CN)

(72) Inventors: Hong Ding, Shanghai (CN); Liang Liu, Shanghai (CN); Feng Lu, Shanghai (CN); Kang Yang, Shanghai (CN)

(73) Assignee: SHANGHAI TIANMA MICRO-ELECTRONICS CO., LTD., Shanghai (CN)

( * ) Notice: Subject to any disclaimer, the term of this patent is extended or adjusted under 35 U.S.C. 154(b) by 0 days.

(21) Appl. No.: 15/806,268

(22) Filed: Nov. 7, 2017

(65) Prior Publication Data

US 2018/0129330 A1  May 10, 2018

(30) Foreign Application Priority Data

Jun. 30, 2017 (CN) .......................... 2017 1 0523632

(51) Int. Cl.
*G06F 3/041* (2006.01)
*G06F 3/044* (2006.01)

(52) U.S. Cl.
CPC ............ *G06F 3/0414* (2013.01); *G06F 3/044* (2013.01); *G06F 3/0412* (2013.01); *G06F 3/0416* (2013.01); *G06F 2203/04103* (2013.01); *G06F 2203/04105* (2013.01); *G06F 2203/04107* (2013.01); *G06F 2203/04111* (2013.01)

(58) Field of Classification Search
CPC .................. G06F 3/044; G06F 3/0414; G06F 2203/04104
See application file for complete search history.

(56) References Cited

U.S. PATENT DOCUMENTS

| | | | |
|---|---|---|---|
| 2013/0076646 A1* | 3/2013 | Krah ..................... | G06F 3/0414 345/173 |
| 2015/0331517 A1* | 11/2015 | Filiz ...................... | G06F 3/0414 345/173 |
| 2015/0362960 A1* | 12/2015 | Chang ..................... | G06F 3/044 345/173 |
| 2017/0023420 A1* | 1/2017 | Vosgueritchian ....... | G01L 1/225 |

(Continued)

FOREIGN PATENT DOCUMENTS

CN          103019438 A       4/2013

*Primary Examiner* — Yuzhen Shen
(74) *Attorney, Agent, or Firm* — Kilpatrick Townsend & Stockton, LLP

(57) ABSTRACT

Disclosed are a touch display panel and a touch display device. The touch display panel comprises a display region and a non-display region surrounding the display region, the non-display region is provided with at least one pressure-sensitive touch unit; the display region is provided with a plurality of touch location detection electrodes; the touch display panel further comprises a plurality of touch location wirings; each of the touch location wirings is electrically connected with the corresponding touch location detection electrode of the plurality of touch location detection electrodes; in the pressure-sensitive detection stage, at least one of the touch location wirings is reused as a signal line of the pressure-sensitive touch unit, and the pressure-sensitive touch unit is configured to detect the magnitude of the touch pressure.

15 Claims, 17 Drawing Sheets

(56) References Cited

U.S. PATENT DOCUMENTS

2017/0235413 A1* 8/2017 Koizumi ................ G06F 3/044
                                                    345/174
2018/0004306 A1* 1/2018 Ebisui .................... G06F 3/044

* cited by examiner

TOUCH DISPLAY PANEL, TOUCH DISPLAY DEVICE AND DRIVE METHOD

CROSS-REFERENCE TO RELATED APPLICATIONS

This application claims priority to Chinese Patent Application No. 201710523632.X, filed on Jun. 30, 2017 and entitled "TOUCH DISPLAY PANEL, TOUCH DISPLAY DEVICE AND DRIVE METHOD", the disclosure of which is incorporated herein by reference in its entirety.

TECHNICAL FIELD

The present disclosure relates to the field of touch display technologies, and in particular, to a touch display panel, a touch display device and a drive method.

BACKGROUND

In pressure sensing technologies, a pressure sensing device is added to a display screen. Touching the display screen by a finger and pressing the display screen by a finger would bring different interaction effects. That is, the screen may "feel" the different forces among slight click, normal touch and heavy press, so as to feel the diversities of finger operation, so that more diversified operation modes may be realized.

In an existing pressure sensing display panel, a pressure-sensitive touch unit is generally provided in a non-display region of the display panel, so that the normal display of a display region would not be affected by the pressure-sensitive touch unit. However, with the arrangement that the pressure-sensitive touch unit occupies the non-display region of the display panel, because each pressure-sensitive touch unit is provided with a plurality of signal lines connected with a drive chip or a pressure-sensitive detection circuit, on one hand, the space of other signal lines of the display panel may be occupied, so that the space between signal lines may be shortened, causing short circuit or coupling; on the other hand, the arrangement of the signal lines connected with the pressure-sensitive touch unit may widen the frame of the display panel, which does not conform with the development trend for a narrow frame.

SUMMARY

The present disclosure provides a touch display panel, a touch display device and a drive method, thereby reducing the size of the frame of the touch display panel.

In a first aspect, embodiments of the disclosure provide a touch display panel, which comprises: a display region and a non-display region surrounding the display region; the non-display region is provided with at least one pressure-sensitive touch unit; the display region is provided with a plurality of touch location detection electrodes; the touch display panel further includes a plurality of touch location wirings, and each of the touch location wirings is electrically connected with the corresponding touch location detection electrode; in the pressure-sensitive detection stage, at least one of the touch location wirings is reused as a signal line of the pressure-sensitive touch unit, and the pressure-sensitive touch unit is configured to detect the magnitude of the touch pressure.

In a second aspect, embodiments of the disclosure further provide a touch display device, which comprises the touch display panel of the first aspect.

In a third aspect, embodiments of the disclosure further provide a drive method for a touch display panel, and each drive cycle of the touch display panel includes at least one pressure-sensitive detection stage, and the drive method includes: reusing, in the pressure-sensitive detection stage, at least one of the touch location wirings as a signal line of the pressure-sensitive touch unit, and the pressure-sensitive touch unit is configured to detect the magnitude of the touch pressure.

In the embodiments of present disclosure, in the pressure-sensitive detection stage, at least one of the touch location wirings is reused as a signal line of the pressure-sensitive touch unit, and the pressure-sensitive touch unit is configured to detect the magnitude of the touch pressure. Moreover, because at least one of the touch location wirings is reused as a signal line of the pressure-sensitive touch unit, the number of wirings provided in the non-display region of the touch display panel may be reduced, thereby reducing the size of the frame of the touch display panel.

BRIEF DESCRIPTION OF THE DRAWINGS

Drawings needed in the embodiments of the disclosure will be introduced briefly below for more clearly illustrating the technical solutions of the exemplary embodiments of the disclosure. It will be apparent that, the drawings merely illustrate exemplary embodiments of the disclosure. Those skilled in the art can conceive other drawings from the illustrated drawings without inventive efforts.

DETAILED DESCRIPTION

The application will be illustrated in detail in conjunction with the drawings and embodiments. It may be understood that, the embodiments described here are only set for explaining, rather than limiting, the application. Additionally, it further needs to be noted that, for convenient description, the drawings only show the parts related to the application, rather than the whole structure.

A touch display panel according to an embodiment of the disclosure includes a display region and a non-display region surrounding the display region, and the non-display region is provided with at least one pressure-sensitive touch unit, and the display region is provided with a plurality of touch location detection electrodes; the touch display panel further includes a plurality of touch location wirings, each of the touch location wirings is electrically connected with the corresponding touch location detection electrode. In the pressure-sensitive detection stage, at least one of the touch location wirings is reused as a signal line of the pressure-sensitive touch unit, and the pressure-sensitive touch unit is configured to detect the magnitude of the touch pressure. By the touch display panel according to this embodiment of the disclosure, not only a touch location can be detected, but also a touch pressure can be detected. It needs to be noted that, the touch location detection mode of the touch display panel according to the disclosure may be a mutual-capacitance mode or a self-capacitance mode, which is not limited in the disclosure. In the touch location detection stage, a plurality of touch location wirings are configured to transfer a touch location detection signal; in the pressure-sensitive detection stage, at least one of the touch location wirings is reused as a signal line of the pressure-sensitive touch unit, and the pressure-sensitive touch unit is configured to detect the magnitude of the touch pressure. Because the touch location wiring is reused as the signal line of the pressure-sensitive touch unit, the number of wirings in the non-display region of the touch display panel may be reduced, and hence it is favorable to reduce the frame of the touch display panel.

The above content shows the core concept of this application, and the technical solutions in the embodiments of the disclosure will be described clearly and fully below in conjunction with the drawings in the embodiments of the disclosure. It will be apparent that, the embodiments described are merely a part of the embodiments of the disclosure, rather than being the whole embodiments. All other embodiments obtained by one skilled in the art based on the embodiments in the disclosure without inventive efforts will pertain to the protection scope of the disclosure.

Figure 1:
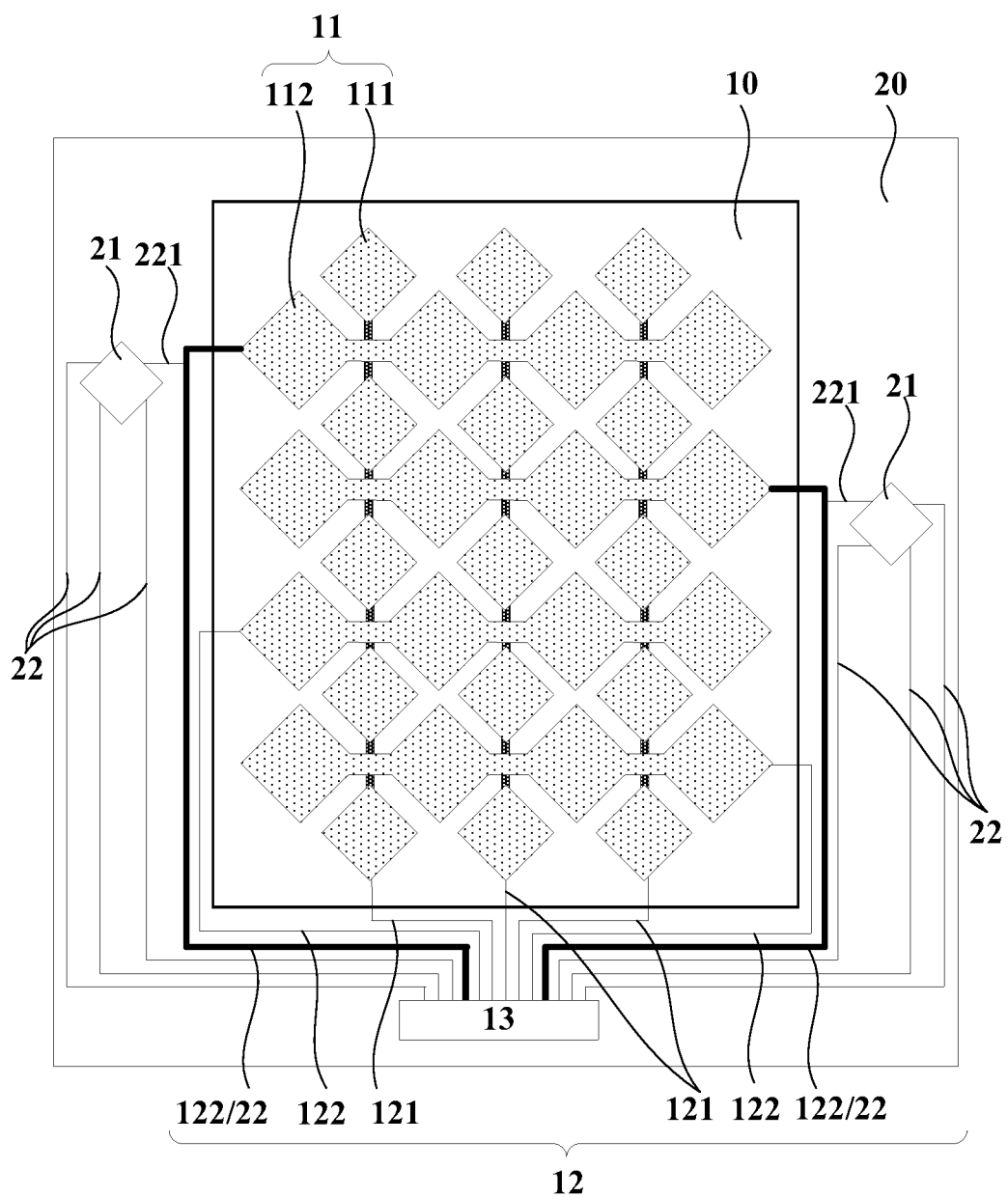
FIG. 1 is a structural representation of a touch display panel according to an embodiment of the disclosure.

FIG. 1 is a structural representation of a touch display panel according to an embodiment of the disclosure. As shown in FIG. 1, the touch display panel according to the embodiment of the disclosure includes a display region 10 and a non-display region 20 surrounding the display region. The non-display region 20 is provided with at least one pressure-sensitive touch unit 21 (two pressure-sensitive touch units 21 are exemplarily provided in FIG. 1), the display region 10 is provided with a plurality of touch location detection electrodes 11. The touch display panel further includes a plurality of touch location wirings 12, and each of the touch location wirings 12 is electrically connected with a corresponding touch location detection electrode 11.

The touch display panel shown in FIG. 1 is applicable to implement touch location detection via a mutual-capacitance touch detection mode. Referring to FIG. 1, the plurality of touch location detection electrodes 11 include a plurality of mutual-capacitance touch location detection drive electrodes 111 and a plurality of touch location detection sensing electrodes 112; the touch location wiring 12 includes a touch location drive wiring 121 and a touch location sensing wiring 122; the mutual-capacitance touch location detection sensing electrode 112 is electrically connected with the corresponding touch location sensing wiring 122, and the mutual-capacitance touch location detection drive electrode 111 is electrically connected with the corresponding touch location drive wiring 121. In the touch location detection stage, a touch location may be detected by detecting the capacitance change between the plurality of mutual-capacitance touch location detection sensing electrodes 112 and the plurality of mutual-capacitance touch location detection drive electrodes 111. In the pressure-sensitive detection stage, at least one of the touch location wiring 12 is reused as a signal line 22 of the pressure-sensitive touch unit 21, and exemplarily in FIG. 1, one of the touch location sensing wiring 122 is reused as a signal line 22 of the pressure-sensitive touch unit 21 on the left side of FIG. 1, and another one of the touch location sensing wirings 122 is reused as a signal line 22 of the pressure-sensitive touch unit 21 on the right side of FIG. 1. At this time, the touch location sensing wiring 122 reused as the signal line of the pressure-sensitive touch unit 21 provides an input or output signal to the corresponding pressure-sensitive touch unit 21, and the pressure-sensitive touch unit 21 is configured to detect the magnitude of the touch pressure.

It needs to be noted that, in order to clearly show the touch location wiring reused as the signal line of the pressure-sensitive touch unit 21, the touch location wiring reused as the signal line 22 of the pressure-sensitive touch unit 21 is shown in a bold mode in the drawings with respect to embodiments.

Figure 2:
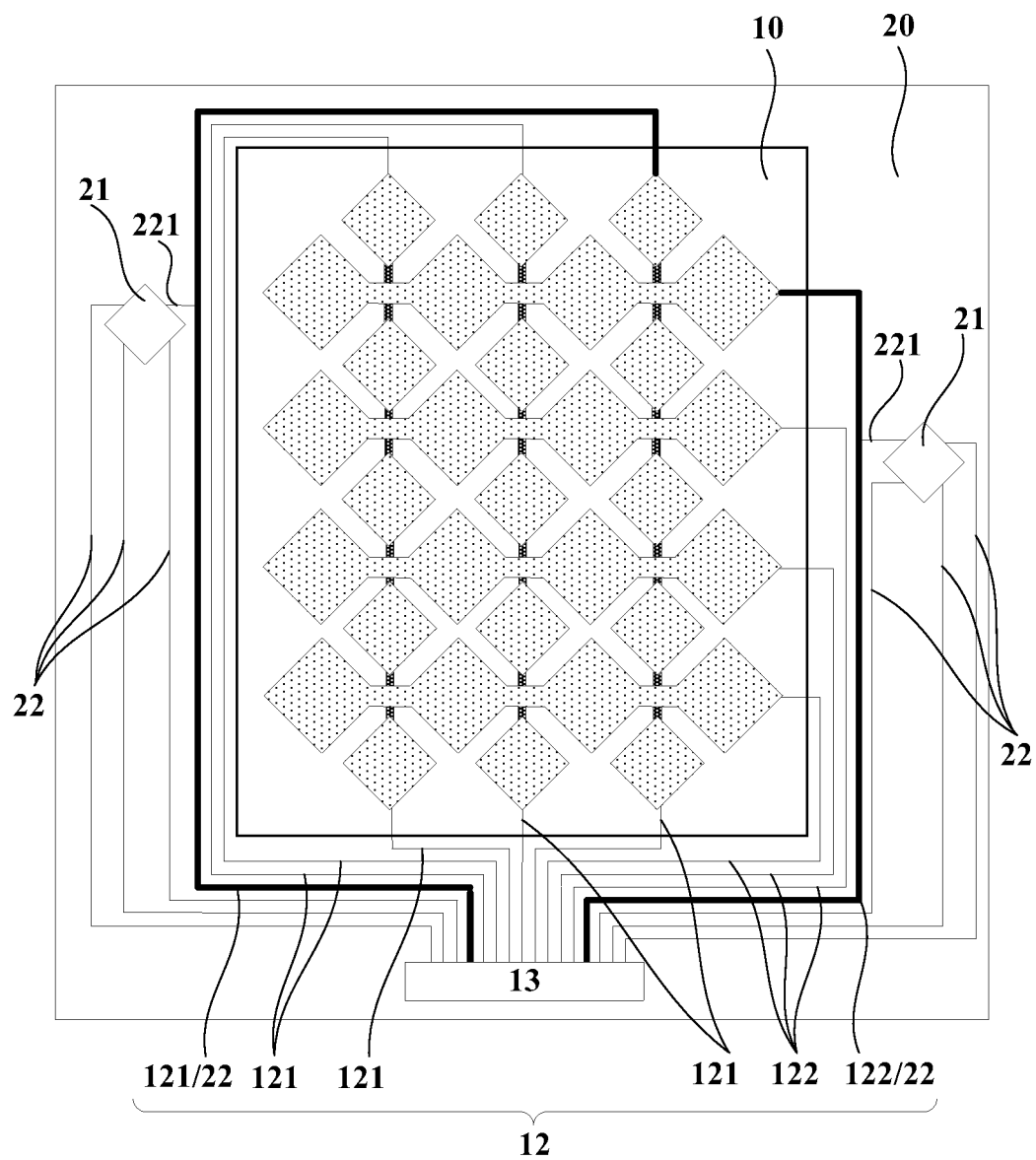
FIG. 2 is a structural representation of another touch display panel according to an embodiment of the disclosure.

In one embodiment, in order to avoid the situation that a difference between the drive signals applied to the two ends of the mutual-capacitance touch location detection drive electrode 111 is too large due to the too large voltage drop on the lead wire connecting with the mutual-capacitance touch location detection drive electrodes 111, as shown in FIG. 2, each column of mutual-capacitance touch location detection drive electrodes 111 may be further provided with two touch location drive wirings 121 which are respectively electrically connected with the two ends of each column of mutual-capacitance touch location detection drive electrodes 111. As shown in FIG. 2, exemplarily, one touch location drive wiring 121 is reused as a signal line 22 of the pressure-sensitive touch unit 21 on the left side of FIG. 2, and one touch location sensing wiring 122 is reused as a signal line 22 of the pressure-sensitive touch unit 21 on the right side of FIG. 1. In the pressure-sensitive detection stage, the touch location drive wiring 121 and the touch location sensing wiring 122 each reused as the signal line of the pressure-sensitive touch unit 21 provide an input or output signal to the corresponding pressure-sensitive touch unit 21, so that the pressure-sensitive touch unit 21 can detect the magnitude of the touch pressure.

In this embodiment of the disclosure, a touch location drive wiring or a touch location sensing wiring is reused as the signal line of the pressure-sensitive touch unit, so that the wirings for the pressure-sensitive touch unit are not necessary to be additionally arranged in the non-display region, thereby reducing the number of wirings of the non-display region, and preventing the short circuit or mutual coupling of wiring signals caused due to the too narrow space between wirings because of a too large number of wirings of the non-display region. Moreover, the reduction of the number of wirings of the non-display region may also reduce the size of the frame of the touch display panel. Additionally, referring to FIG. 1 and FIG. 2, the touch location wirings 12 and the signal lines 22 of the pressure-sensitive touch unit 21 have an end connected with a drive chip 13. In this embodiment of the disclosure, because the number of wirings of the non-display region 20 is reduced, the number of interfaces of the drive chip 13 may also be reduced, and hence the cost of the drive chip 13 may be lowered.

Figure 3:
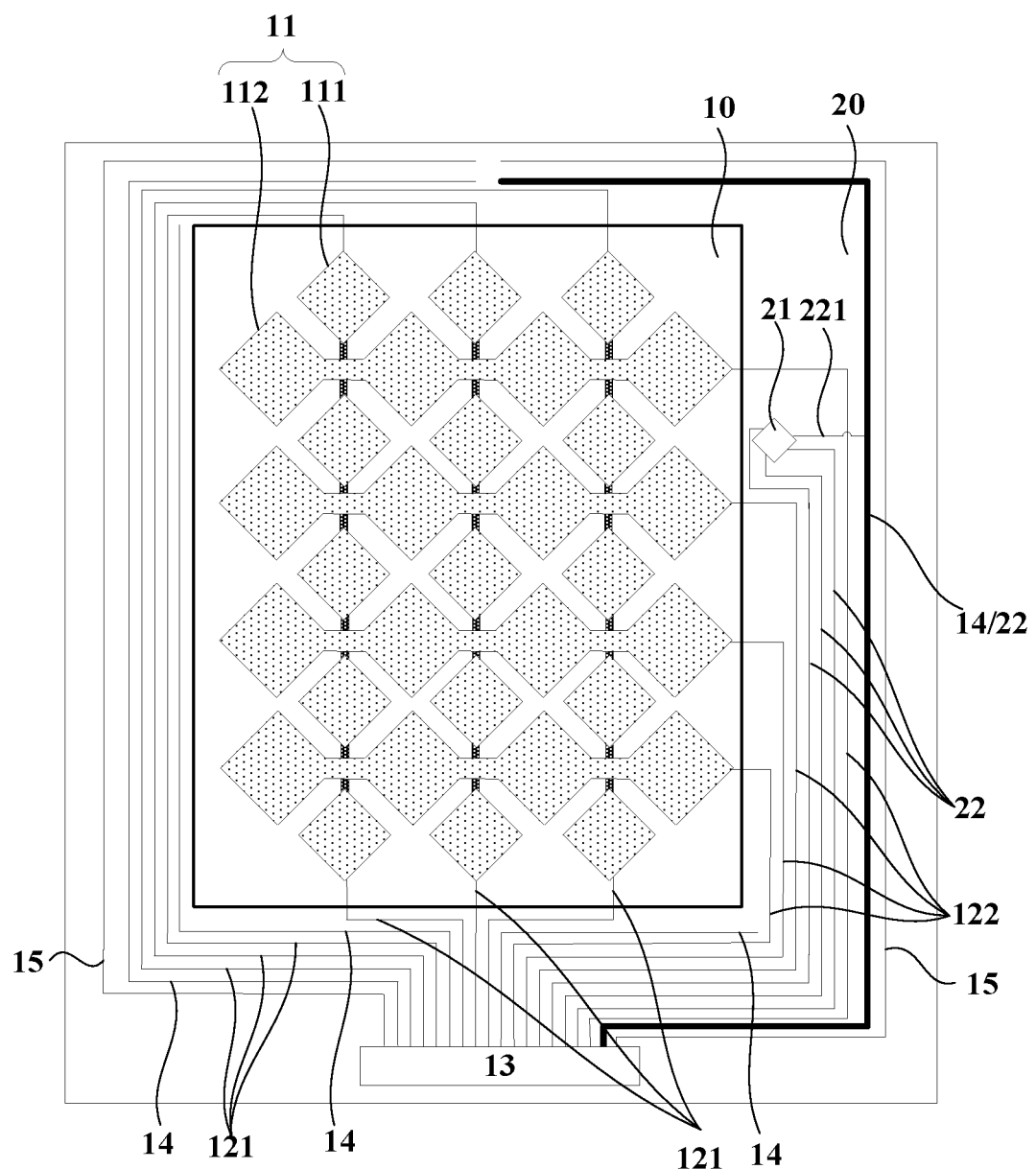
FIG. 3 is a structural representation of another touch display panel according to an embodiment of the disclosure.

FIG. 3 is a structural representation of another touch display panel according to an embodiment of the disclosure. As shown in FIG. 3, the non-display region 20 of the touch display panel is further provided with a ground wire 15 and a plurality of shielding wires 14. The ground wire 15 is configured to shield the static electricity in the touch display panel to avoid the bad touch and display caused by electrostatic charge accumulation. The shielding wire 14 is provided, at least one of, between the touch location drive wiring and the touch location sensing wiring adjacent to each other, between the touch location drive wiring and the ground wire adjacent to each other, between the touch location sensing wiring and the ground wire adjacent to each other, between the touch location drive wiring and the display region adjacent to each other and between the touch location sensing wiring and display region adjacent to each other. Referring to FIG. 3, in this embodiment of the disclosure, exemplarily, shielding wires 14 are provided between the touch location drive wiring 121 and the touch location sensing wiring 122 adjacent to each other, between the touch location drive wiring 121 and ground wire 15 adjacent to each other, between the touch location sensing wiring 122 and ground wire 15 adjacent to each other and between the touch location drive wiring 121 and display region 10 adjacent to each other.

When the distance between the touch location drive wiring 121 and the touch location sensing wiring 122, the distance between the touch location drive wiring 121 and the ground wire 15 and the distance between the touch location sensing wiring 122 and the ground wire 15 are small, capacitance coupling would be generated between adjacent two wires, so that the touch location detection in the display region 10 may be affected. Therefore, in this embodiment of the disclosure, shielding wires 14 are provided between the touch location drive wiring 121 and the touch location sensing wiring 122 adjacent to each other, between the touch location drive wiring 121 and the ground wire 15 adjacent to each other and between the touch location sensing wiring 122 and ground wire 15 adjacent to each other, so that the precision of touch location detection may be improved. Additionally, coupling may occurs between the touch location drive wiring 121 adjacent to the display region 10 and the mutual-capacitance touch location detection sensing electrode 112 on the edge of the display region 10, which causes a change in the potential on the mutual-capacitance touch location detection sensing electrode 112 on the edge of the display region 10; also, coupling may occurs between the touch location sensing wiring 122 adjacent to the display region 10 and the mutual-capacitance touch location detection drive electrode 111 on the edge of the display region 10, which causes a change in the potential on the mutual-capacitance touch location detection drive electrode 111 on the edge of the display region 10, so that an error is present in the touch location detection to affect precision of touch location detection. Therefore, in this embodiment of the disclosure, shielding wires 14 may be further provided between the touch location drive wiring 121 and the display region 10 and between the touch location sensing wiring 122 and the display region 10 in order to shield the coupling between touch location drive wiring and the mutual-capacitance touch location detection sensing electrode or shield the coupling between the touch location sensing wiring and the touch location detection drive electrode.

In this embodiment of the disclosure, at least a part of the shielding wires 14 are reused as a signal line 22 of the pressure-sensitive touch unit 21. Referring to FIG. 3, exemplarily, one pressure-sensitive touch unit 21 is provided in the non-display region 20, and the shielding wire 14 between the touch location sensing wiring 122 and ground wire 15 adjacent to each other is reused as a signal line 22 of the pressure-sensitive touch unit 21. With the touch display panel according to this embodiment of the disclosure, because the shielding wire is reused as a signal line of the pressure-sensitive touch unit, no wiring needs to be additionally provided in the non-display region, thereby reducing the number of wirings of the non-display region, reducing the size of the frame of the touch display panel, reducing the number of interfaces of the drive chip 13 and also lowering the cost.

Figure 4:
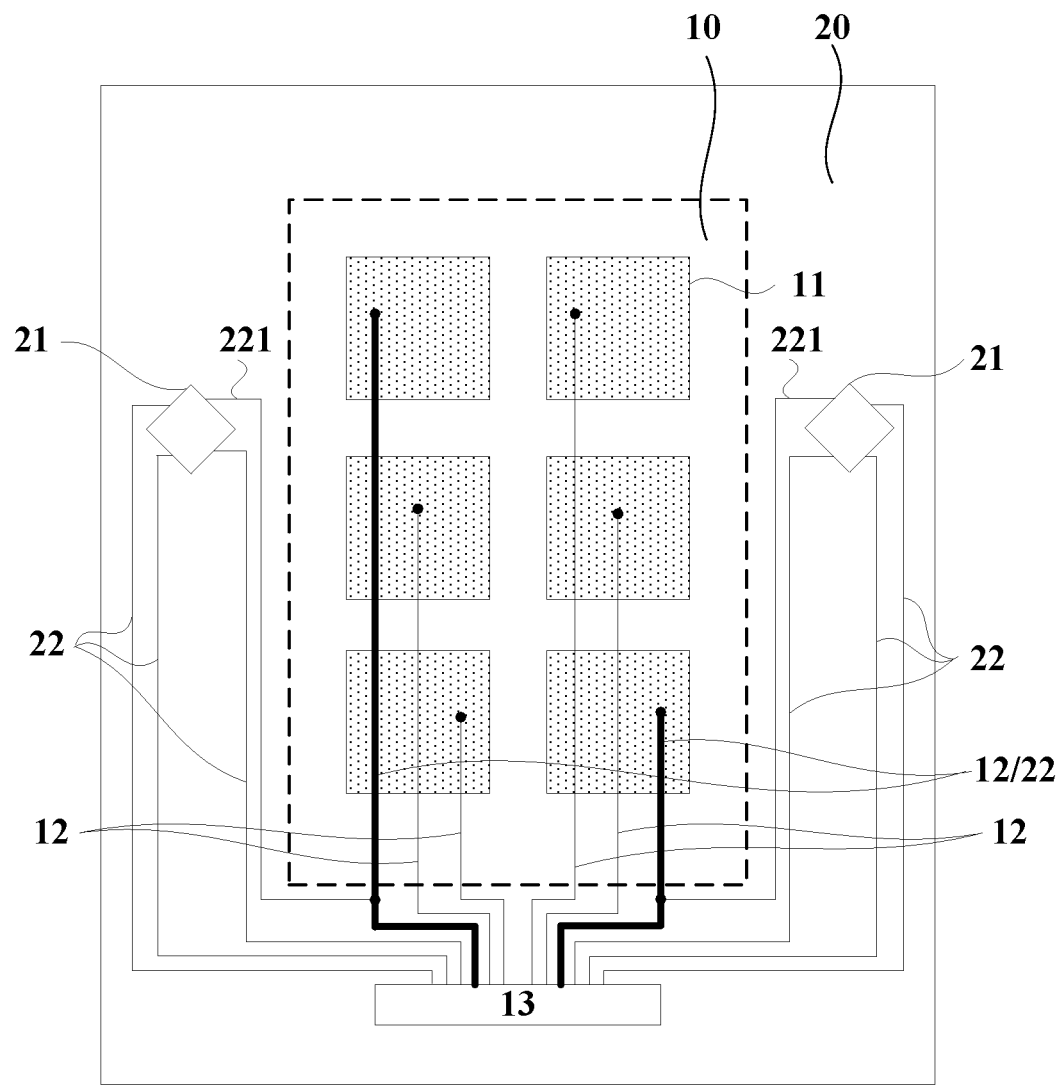
FIG. 4 is a structural representation of another touch display panel according to an embodiment of the disclosure.

FIG. 4 is a structural representation of another touch display panel according to an embodiment of the disclosure. The touch display panel shown in FIG. 4 is applicable to implement touch location detection in a self-capacitance touch detection mode. Referring to FIG. 4, a plurality of touch location detection electrodes 11 form a self-capacitance touch location detection structure. That is, in the self-capacitance touch location detection structure, a plurality of touch location detection electrodes 11 are in a matrix in the display region 10, and each of the touch location wirings 12 is electrically connected with a corresponding touch location detection electrode 11. A plurality of touch location detection electrodes 11 generally form a capacitor with the ground. When a touch object touches any one of the touch location detection electrodes 11, the capacitance between the touch location detection electrode 11 and the ground may change, and a processor of the touch display panel can acquire the signal value on the touch location detection electrode 11 via the touch location wiring 12 electrically connected with the touch location detection electrode 11, thereby determining that the location of the touch location detection electrode 11 is the touch location of the touch object. FIG. 4 exemplarily illustrate three rows and two columns of touch location detection electrodes 11, and the touch location wiring 12 electrically connected with the touch location detection electrode 11 located in the first row and the first column is reused as a signal line 22 of the pressure-sensitive touch unit 21 on the left side in FIG. 4, and the touch location wiring 12 electrically connected with the touch location detection electrode 11 located in the third row and the second column is reused as a signal line 22 of the pressure-sensitive touch unit 21 on the right side in FIG. 4. Likewise, with the self-capacitance touch display panel provided in FIG. 4, the number of wirings of the non-display region may be reduced, the size of the frame may be reduced, the number of interfaces of the drive chip may be reduced, and the cost may be lowered.

It needs to be noted that, in each of the above embodiments, referring to FIG. 1-FIG. 4, the touch display panel further includes a connection wire 221, one end of the connection wire 221 is connected with the touch location wiring 12 reused as the signal line 22 of the pressure-sensitive touch unit 21, and the other end thereof is connected with the pressure-sensitive touch unit 21. Moreover, the connection wire 221 and also the connection point between the connection wire 221 and the touch location wiring 12 reused as the signal line 22 of the pressure-sensitive touch unit 21 are located in the non-display region 20. In practical application, an appropriate location may be designed for the connection wire 221 in the non-display region 20 according to the arrangement of the circuits and wirings in the non-display region of the touch display panel 20, so that the wirings may be arranged in a compact way in the non-display region 20. By providing, in the non-display region 20, the connection wire 221 and also the connection point between the connection wire 221 and the touch location wiring 12 reused as the signal line 22 of the pressure-sensitive touch unit 21, the connection wire 221 and also the connection point between the connection wire 221 and the touch location wiring 12 reused as the signal line 22 of the pressure-sensitive touch unit 21 cannot affect the normal display of the display region 10.

In one embodiment, in the above embodiments, the connection wire 221 and the pressure-sensitive touch unit 21 may be further located on the same layer and made of the same material. During manufacturing, only one etching process is needed, there is no need to make mask plates separately for the pressure-sensitive touch unit 21 and the connection wire 221, so that the cost may be saved, the number of manufacture processes may be reduced, and the production efficiency may be improved.

In the above technical solutions, the pressure-sensitive touch unit on the touch display panel may have various specific structures, and illustration may be given below on the structures of several typical pressure-sensitive touch units, but the disclosure may not be limited hereto.

Figure 5:
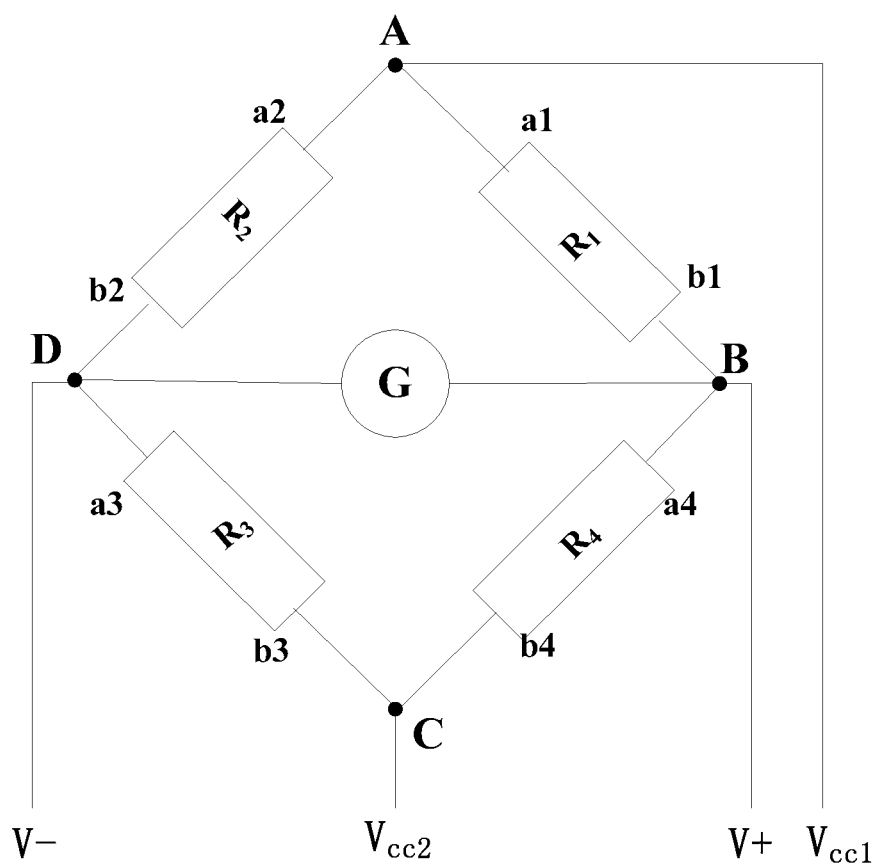
FIG. 5 is a structural representation of a pressure-sensitive touch unit according to an embodiment of the disclosure.

FIG. 5 is a structural representation of a pressure-sensitive touch unit according to an embodiment of the disclosure. As shown in FIG. 5, the pressure-sensitive touch unit includes a first pressure-sensitive resistor $R_1$, a second pressure-sensitive resistor $R_2$, a third pressure-sensitive resistor $R_3$ and a fourth pressure-sensitive resistor $R_4$. The signal line 22 of the pressure-sensitive touch unit includes a first power input signal line $V_{cc1}$, a second power input signal line $V_{cc2}$, a first induction signal measuring signal line $V_+$ and a second induction signal measuring signal line $V-$. The first end a1 of the first pressure-sensitive resistor $R_1$ and the first end a2 of the second pressure-sensitive resistor $R_2$ are connected with the first power input signal line $V_{cc1}$, the second end b1 of the first pressure-sensitive resistor $R_1$ and the first end a4 of the fourth pressure-sensitive resistor $R_4$ are connected with the first induction signal measuring signal line $V_+$, the second end b4 of the fourth pressure-sensitive resistor $R_4$ and the second end b3 of the third pressure-sensitive resistor $R_3$ are connected with the second power input signal line $V_{cc2}$, and the first end a3 of the third pressure-sensitive resistor $R_3$ and the second end b2 of the second pressure-sensitive resistor $R_2$ are connected with the second induction signal measuring signal line $V_-$.

The pressure-sensitive touch unit shown in FIG. 5 forms a Wheatstone bridge structure. The first pressure-sensitive resistor $R_1$, the second pressure-sensitive resistor $R_2$, the third pressure-sensitive resistor $R_3$ and the fourth pressure-sensitive resistor $R_4$ are connected to form a quadrangle ABCD, which is called the four arms of the bridge. The diagonal BD of the quadrangle ABCD is connected with a galvanometer G, the two poles of the galvanometer G are respectively connected with the first induction signal measuring signal line $V_+$ and the second induction signal measuring signal line $V_-$, and the A, C on the diagonal AC of the quadrangle ABCD are respectively connected with the first power input signal line $V_{cc1}$ and the second power input signal line $V_{cc2}$. When a certain difference exists between the voltage provided on the first power input signal line $V_{cc1}$ and the voltage provided on the second power input signal line $V_{cc2}$, a current may pass through each of the branches in the bridge circuit. When the resistance values of the first pressure-sensitive resistor $R_1$, the second pressure-sensitive resistor $R_2$, the third pressure-sensitive resistor $R_3$ and the fourth pressure-sensitive resistor $R_4$ meet the condition $$\frac{R_1}{R_4} = \frac{R_2}{R_3},$$

the potential on the two points B and D may be equal to each other, the current passing through the galvanometer G may be zero, so that the pointer of the galvanometer G may point to zero, and the bridge may be in a balanced state. Thus $$\frac{R_1}{R_4} = \frac{R_2}{R_3}$$

is called a bridge equilibrium condition. When the resistance values of the first pressure-sensitive resistor $R_1$, the second pressure-sensitive resistor $R_2$, the third pressure-sensitive resistor $R_3$ and the fourth pressure-sensitive resistor $R_4$ does not meet the above bridge equilibrium condition, the potentials on the two points B and D may not be equal to each other, and at this time, the current passing through the galvanometer G may not be 0, the pointer of the galvanometer G may be deflected and output the corresponding signal value, thereby determining the magnitude of the touch pressure.

Figure 6:
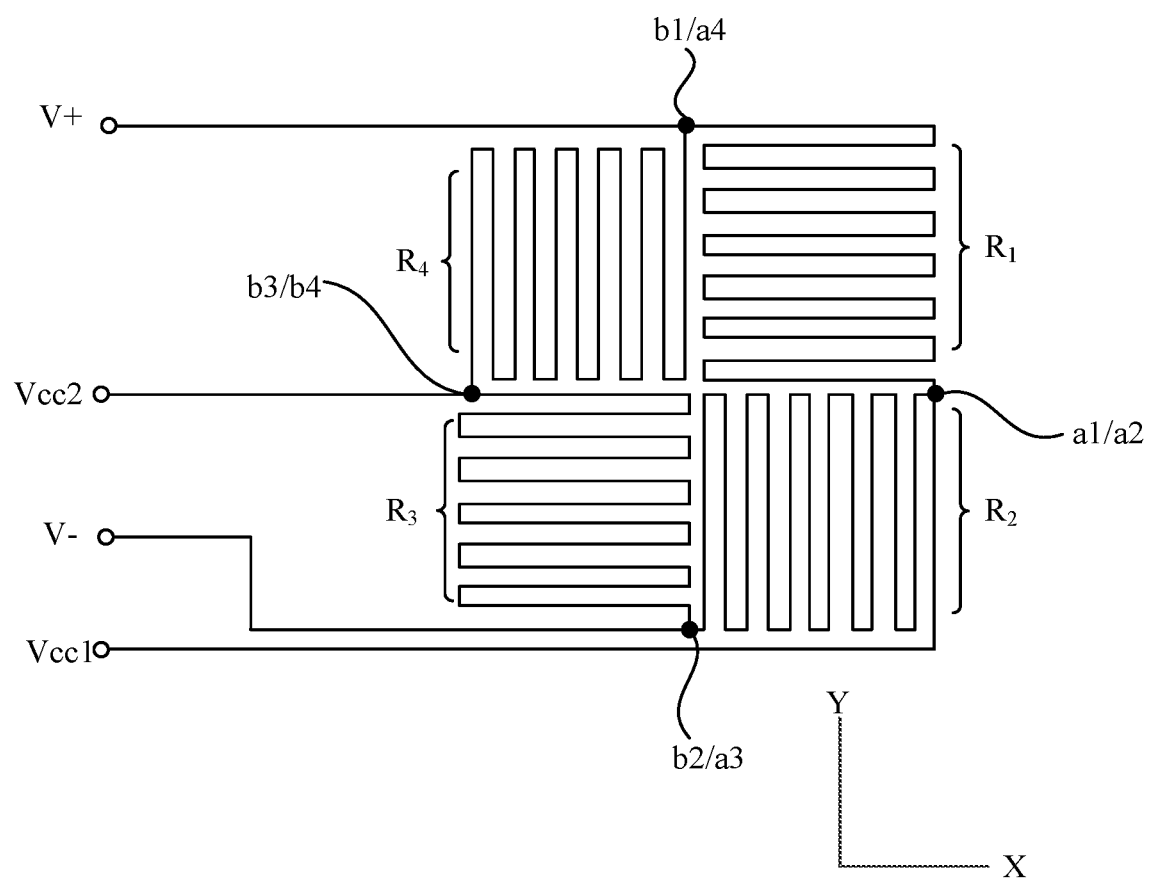
FIG. 6 is a structural representation of another pressure-sensitive touch unit according to an embodiment of the disclosure.

In one embodiment, FIG. 6 is a structural representation of another pressure-sensitive touch unit according to an embodiment of the disclosure. The touch display panel may include a first extension direction X and a second extension direction Y, and the first extension direction X is intersected with the second extension direction Y. The component of the extension length of the first pressure-sensitive resistor $R_1$ from the first end a1 to the second end b1 in the first extension direction X may be larger than the component thereof in the second extension direction Y, the component of the extension length of the second pressure-sensitive resistor $R_2$ from the first end a2 to the second end b2 in the second extension direction Y may be larger than the component thereof in the first extension direction X, the component of the extension length of the third pressure-sensitive resistor $R_3$ from the first end a3 to the second end b3 in the first extension direction X may be larger than the component thereof in the second extension direction Y, and the component of the extension length of the fourth pressure-sensitive resistor $R_4$ from the first end a4 to the second end b4 in the second extension direction Y may be larger than the component thereof in the first extension direction X. Referring To FIG. 6, each of the first pressure-sensitive resistor $R_1$, the second pressure-sensitive resistor $R_2$, the third pressure-sensitive resistor $R_3$ and the fourth pressure-sensitive resistor forms a serpentine-like structure.

The pressure-sensitive touch unit generally has the deformations sensed by the first pressure-sensitive resistor $R_1$, the second pressure-sensitive resistor $R_2$, the third pressure-sensitive resistor $R_3$ and the fourth pressure-sensitive resistor $R_4$ be different from each other. For example, the first pressure-sensitive resistor $R_1$ and the third pressure-sensitive resistor $R_3$ sense a deformation of a compression, and the second pressure-sensitive resistor $R_2$ and the fourth pressure-sensitive resistor $R_4$ sense a deformation of a stretch. Referring to FIG. 5, the first pressure-sensitive resistor $R_1$ and the second pressure-sensitive resistor $R_2$, as well as the third pressure-sensitive resistor $R_3$ and the fourth pressure-sensitive resistor $R_4$, are separated spatially. However, when the temperature changes locally, the first pressure-sensitive resistor $R_1$, the second pressure-sensitive resistor $R_2$, the third pressure-sensitive resistor $R_3$ and the fourth pressure-sensitive resistor $R_4$ may be in different temperature environments, and temperature may have different effects on the resistance values of the first pressure-sensitive resistor $R_1$, the second pressure-sensitive resistor $R_2$, the third pressure-sensitive resistor $R_3$ and the fourth pressure-sensitive resistor $R_4$, which affects the precision of pressure detection of the pressure-sensitive touch unit. In the pressure-sensitive touch unit provided in FIG. 6, the first pressure-sensitive resistor $R_1$ and the third pressure-sensitive resistor $R_3$ are made to sense the strain along the first extension direction X, and the second pressure-sensitive resistor $R_2$ and the fourth pressure-sensitive resistor $R_4$ are made to sense the strain along the second extension direction Y. Because the direction in which the first pressure-sensitive resistor $R_1$ senses the strain is different from the direction in which the second pressure-sensitive resistor $R_2$ senses the strain, and the direction in which the fourth pressure-sensitive resistor $R_4$ senses the strain is different from the direction in which the third pressure-sensitive resistor $R_3$ senses the strain, the first pressure-sensitive resistor $R_1$, the second pressure-sensitive resistor $R_2$, the third pressure-sensitive resistor $R_3$ and the fourth pressure-sensitive resistor $R_4$ may be distributed at the same location in spatially or approximate locations, so that the first pressure-sensitive resistor $R_1$ and the second pressure-sensitive resistor $R_2$, as well as the third pressure-sensitive resistor $R_3$ and the fourth pressure-sensitive resistor $R_4$, may have synchronous change in temperature, thereby eliminating the affection of temperature difference, and improving the pressure sensing precision.

Figure 7:
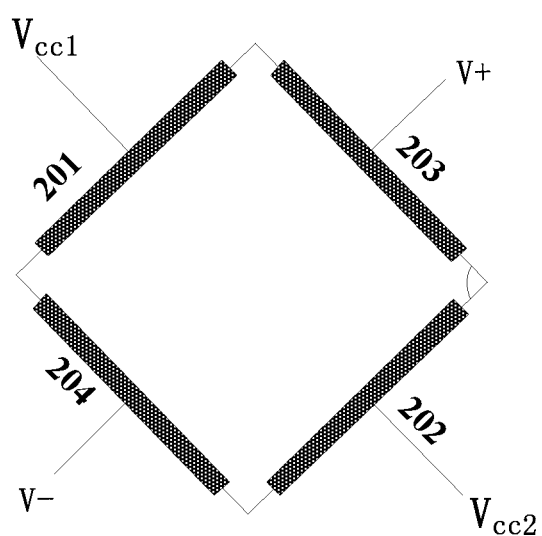
FIG. 7 is a structural representation of another pressure-sensitive touch unit according to an embodiment of the disclosure.

In one embodiment, the pressure-sensitive touch unit in the disclosure may also be a form of block. The shape thereof is a polygon including at least four sides, and it is made of a semiconductor material. The pressure-sensitive touch unit includes a first connection terminal, a second connection terminal, a third connection terminal and a fourth connection terminal. The signal line of the pressure-sensitive touch unit includes a first power input signal line, a second power input signal line, a first induction signal measuring signal line and a second induction signal measuring signal line. The first power input signal line is electrically connected with the first connection terminal of the pressure-sensitive touch unit; the second power input signal line is electrically connected with the second connection terminal of the pressure-sensitive touch unit; the first induction signal measuring signal line is electrically connected with the third connection terminal of the pressure-sensitive touch unit; the second induction signal measuring signal line is electrically connected with the fourth connection terminal of the pressure-sensitive touch unit; the first connection terminal, the second connection terminal, the third connection terminal and the fourth connection terminal are respectively provided on the four sides of the polygon, the side where the first connection terminal is located is not connected with the side where the second connection terminal is located, and the side where the third connection terminal is not connected with the side where the fourth connection terminal is located. Exemplarily, in FIG. 7, illustration is given by an example in which the pressure-sensitive touch unit is a quadrangle; however, in the embodiments of the disclosure, the shape of the pressure-sensitive touch unit is not limited. Referring to FIG. 7, the pressure-sensitive touch unit is a quadrangle, and the first connection terminal 201, the second connection terminal 202, the third connection terminal 203 and the fourth connection terminal 204 are respectively located on the first side, the second side, the third side and the fourth side of the pressure-sensitive touch unit. The first side and the second side of the pressure-sensitive touch unit are provided opposite to each other, the third side and the fourth side are provided opposite to each other. The first connection terminal 201 is electrically connected with the first power input signal line $V_{cc1}$, the second connection terminal 202 is electrically connected with the second power input signal line $V_{cc2}$, the third connection terminal 203 is electrically connected with the first induction signal measuring signal line $V_+$, and the fourth connection terminal 204 is electrically connected with the second induction signal measuring signal line $V_-$. The first power input signal line $V_{cc1}$ and the second power input signal line $V_{cc2}$ are configured to input a power drive signal to the pressure-sensitive touch unit; the first induction signal measuring signal line $V_+$ and the second induction signal measuring signal line $V_-$ are configured to output a touch pressure detection signal from the pressure-sensitive touch unit. The pressure-sensitive touch unit shown in FIG. 7 may be equivalent to the Wheatstone bridge circuit formed by the first pressure-sensitive resistor $R_1$, the second pressure-sensitive resistor $R_2$, the third pressure-sensitive resistor $R_3$ and the fourth pressure-sensitive resistor $R_4$ in FIG. 5, and the pressure detection principle thereof is the same as the detection principle of the pressure-sensitive touch unit shown in FIG. 5, and thus it may not be described again here.

Based on each of the above embodiments, if the non-display region of the touch display panel is provided with a plurality of pressure-sensitive touch units, in order to reduce the number of signal lines of the pressure-sensitive touch unit, a plurality of pressure-sensitive touch units may share one first power input signal line, and a plurality of pressure-sensitive touch units may share one second power input signal line. By such a configuration, the number of wirings in the non-display region of the touch display panel may be reduced. In one embodiment, in the pressure-sensitive detection stage, at least a part of the touch location wirings may be reused as the first power input signal line of the pressure-sensitive touch unit. Exemplarily, each of a plurality of pressure-sensitive touch units in the non-display region of the touch display panel may reuse a touch location wiring as the first power input signal line. By such an arrangement, the first power input signal line of each of the pressure-sensitive touch units is independent from the first power signal line of other pressure-sensitive touch units, and hence there is no mutual effect there between. By such a configuration, the detection precision of each of the pressure-sensitive touch units may be improved without increasing the number of signal lines.

Based on each of the above embodiments, if one of touch location wirings is reused as the first signal line of the pressure-sensitive touch unit and another one of the touch location wirings is reused as the second signal line of the pressure-sensitive touch unit, the resistance value between the first signal line and the second signal line needs to be larger than 100 KΩ. The reason of such a configuration lies in that, when the touch location wirings are reused as two signal lines in the same pressure-sensitive touch unit, for example, a touch location wiring is reused as the first signal line of the pressure-sensitive touch unit and another touch location wiring is reused as the second signal line of the pressure-sensitive touch unit, if the resistance between the first signal line and the second signal line is too small, in the touch location detection stage, short circuit may possibly occur between the two touch location wirings reused as the first signal line and the second signal line, and hence the normal touch location detection may be affected.

For example, the touch display panel according to this embodiment of the disclosure may be a touch liquid crystal display panel or a touch OLED display panel. For example, the film layer of the pressure-sensitive touch unit may be located on one side of the color filter substrate of the touch liquid crystal display that is far from the liquid crystal, or the film layer of the pressure-sensitive touch unit may be located on one side of the encapsulation layer of the touch OLED display panel that is far from the light-emitting element. In the above technical solutions, the pressure-sensitive touch unit on the touch display panel may be located at various locations on the film layer inside the touch display panel, and illustration may be given below on several typical structures thereof, but the disclosure may not be limited hereto. It needs to be noted that, illustration may be given below in FIG. 8-FIG. 13 which take a mutual-capacitance touch detection structure as an example, but it is not limited by the embodiments of the disclosure. Based on the concept of the disclosure, one skilled in the art may obtain a relation between each film layer in a self-capacitance touch detection-type touch display panel.

Figure 8:
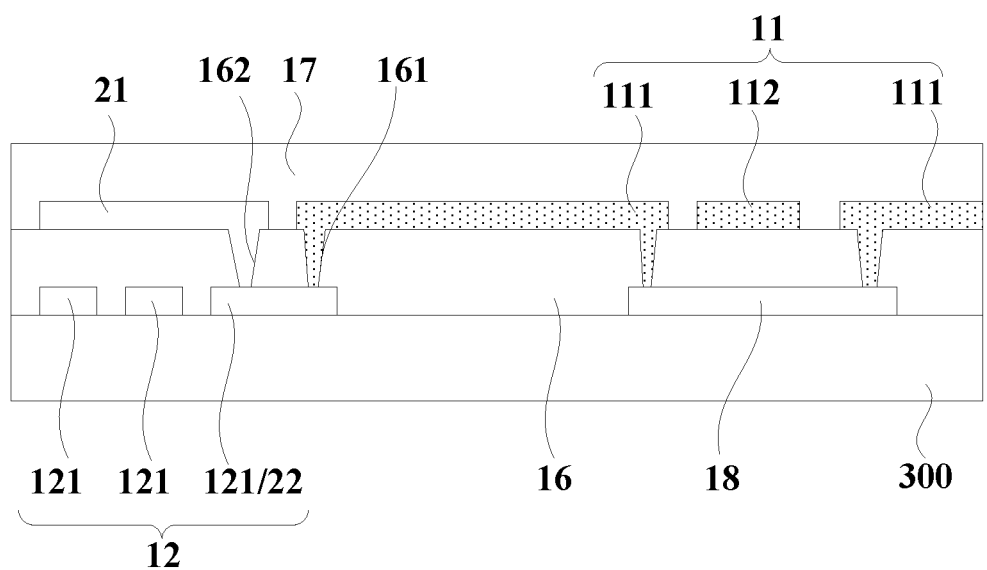
FIG. 8 is a schematic sectional view of a touch display panel according to an embodiment of the disclosure.

FIG. 8 is a schematic sectional view of a touch display panel according to an embodiment of the disclosure. As shown in FIG. 8, the touch display panel includes a display module 300. The display module 300 may for example be a liquid crystal display module or an OLED display module, and a plurality of touch location wirings 12, a first insulating layer 16, a plurality of touch location detection electrodes 11 and a protective layer 17 are successively provided on the emergent light side of the display module 300 and along the emergent light direction of the display module 300. The first insulating layer 16 is provided with a plurality of first sub-via holes 161 and second sub-via holes 162, and each touch location wiring 12 is electrically connected with a corresponding touch location detection electrode 11 via a first sub-via hole 161. The pressure-sensitive touch unit 21 and the plurality of touch location detection electrodes 11 are provided on the same layer. The pressure-sensitive touch unit 21 is electrically connected via a second sub-via hole 162 with the touch location wiring 12 reused as the signal line 22. Referring to FIG. 8, the plurality of touch location detection electrodes 11 include a plurality of mutual-capacitance touch location detection drive electrodes 111 and a plurality of touch location detection sensing electrodes 112. The touch location wiring 12 includes a touch location drive wiring 121 and a touch location sensing wiring (not shown in FIG. 8); the mutual-capacitance touch location detection drive electrodes 111, the mutual-capacitance touch location detection sensing electrodes 112 and the pressure-sensitive touch unit 21 are provided on the same layer. The mutual-capacitance touch location detection drive electrodes 111 in the same row or the same column are electrically connected with each other via a bridging structure 18. The mutual-capacitance touch location detection drive electrode 111 is electrically connected with the corresponding touch location drive wiring 121 via a first sub-via hole 161. The touch location drive wiring 121 is reused as the signal line 22 of the pressure-sensitive touch unit 21. The pressure-sensitive touch unit 21 is electrically connected via a second sub-via hole 162 with the touch location wiring 12 reused as the signal line 22.

Figure 9:
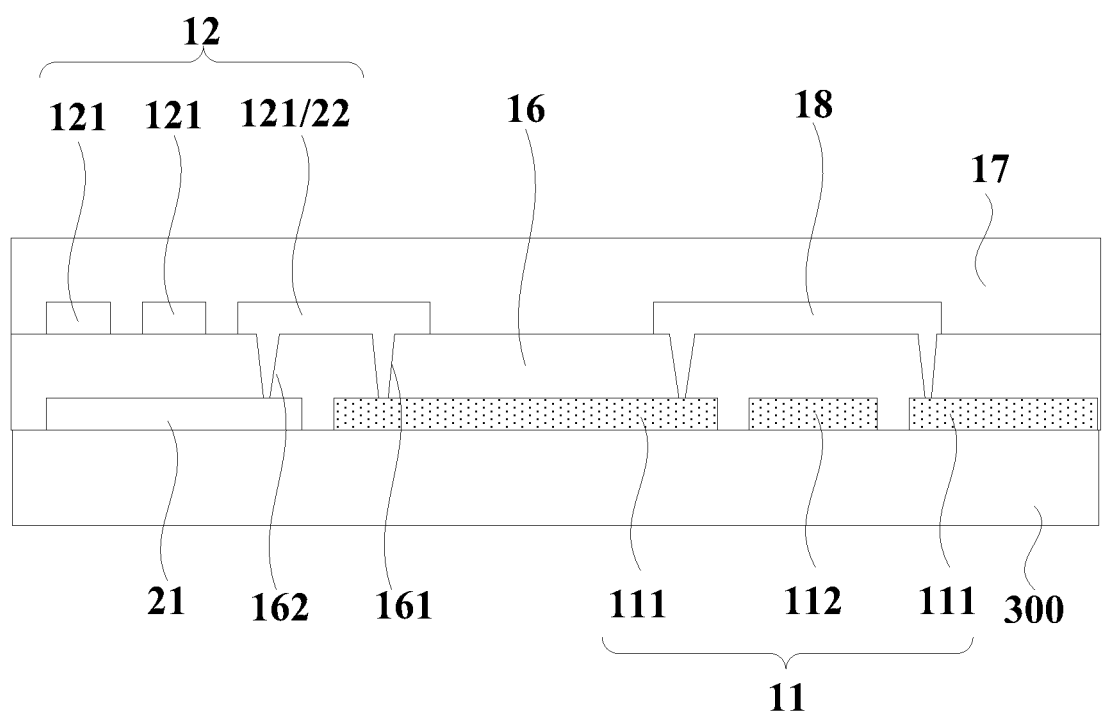
FIG. 9 is a schematic sectional view of another touch display panel according to an embodiment of the disclosure.

FIG. 9 is a schematic sectional view of another touch display panel according to an embodiment of the disclosure. As different from FIG. 8, the film layer of the touch location wiring 12 is located on one side of the film layer of the touch location detection electrode 11 that is far from the display module 300. Referring to FIG. 9, the display module 300 is successively provided with a plurality of touch location detection electrodes 11 (including a plurality of mutual-capacitance touch location detection drive electrodes 111 and a plurality of touch location detection sensing electrodes 112), a first insulating layer 16, a plurality of touch location wirings 12 (which include touch location drive wirings 121 and touch location sensing wirings (not shown in FIG. 9)) and a protective layer 17 on the emergent light side of the display module 300 and along the emergent light direction of the display module 300. The mutual-capacitance touch location detection drive electrodes 111, the mutual-capacitance touch location detection sensing electrodes 112 and the pressure-sensitive touch unit 21 are provided on the same layer. The mutual-capacitance touch location detection drive electrodes 111 in the same row or the same column are electrically connected with each other via a bridging structure 18. The mutual-capacitance touch location detection drive electrode 111 is electrically connected with the corresponding touch location drive wiring 121 via a first sub-via hole 161. The touch location drive wiring 121 is reused as the signal line 22 of the pressure-sensitive touch unit 21. The pressure-sensitive touch unit 21 is electrically connected via a second sub-via hole 162 with the touch location wiring 12 reused as the signal line 22.

In the touch display panel shown in FIG. 8 and FIG. 9, because the pressure-sensitive touch unit and a plurality of touch location detection electrodes are provided on the same layer, the thickness of the whole touch display panel may be reduced. In addition, the pressure-sensitive touch unit and the plurality of touch location detection electrodes may be made of the same material in the same process, so that during the manufacturing process, only one etching process is needed, and there is no need to make mask plates separately for the pressure-sensitive touch unit and the plurality of touch location detection electrodes, and hence the cost may be saved, the number of manufacture processes may be reduced, and the production efficiency may be improved.

Figure 10:
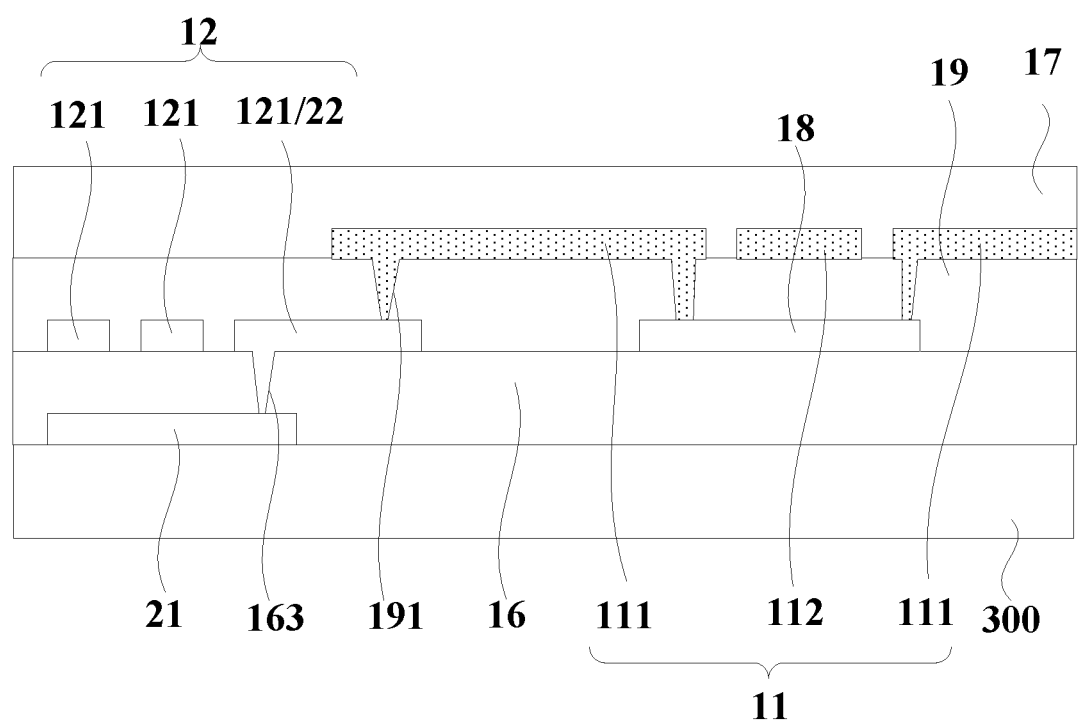
FIG. 10 is a schematic sectional view of another touch display panel according to an embodiment of the disclosure.
Figure 11:
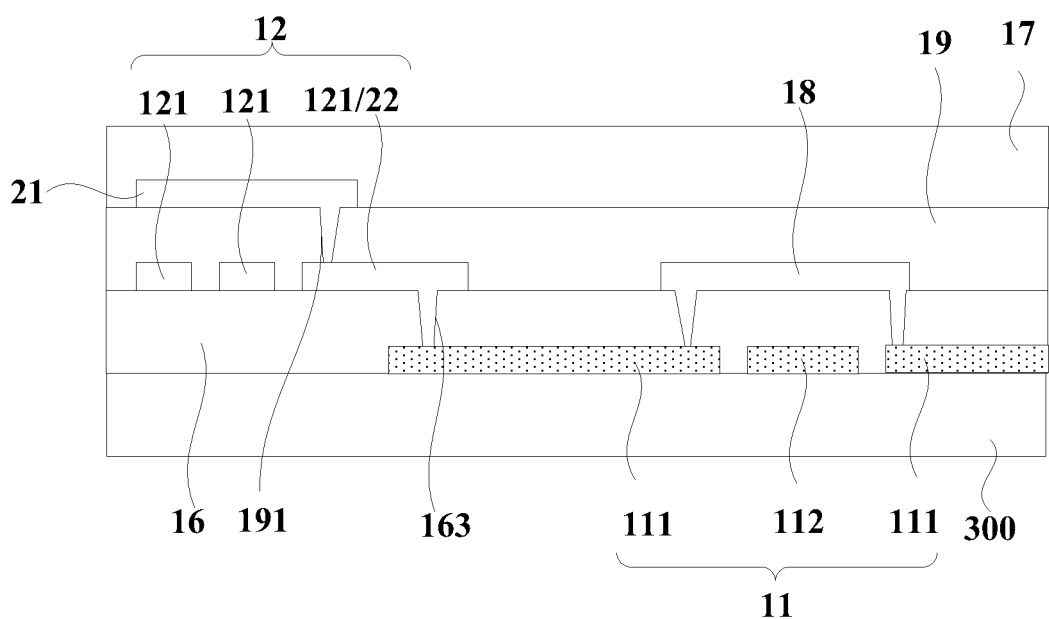
FIG. 11 is a schematic sectional view of another touch display panel according to an embodiment of the disclosure.

In other embodiments, according to the design preferences of the touch display panel, the pressure-sensitive touch unit and the plurality of touch location detection electrodes may be provided on different layers. For example, a plurality of touch location wirings may be provided between the film layer of the pressure-sensitive touch unit and the film layer of the plurality of touch location detection electrodes, a first insulating layer is provided between the plurality of touch location wirings and the film layer of the pressure-sensitive touch unit, and a second insulating layer is provided between the plurality of touch location wirings and the film layer of the plurality of touch location detection electrodes. The first insulating layer is provided with a plurality of first via holes, and the touch location wiring reused as the signal line of the pressure-sensitive touch unit is electrically connected with the corresponding pressure-sensitive touch unit via a first via hole. The second insulating layer is provided with a plurality of second via holes, and each of the touch location wirings is electrically connected with the corresponding touch location detection electrode via a second via hole. As shown in FIG. 10, the touch display panel includes a display module 300, and the display module 300 is successively provided with a pressure-sensitive touch unit 21, a first insulating layer 16, a plurality of touch location wirings 12 (which include touch location drive wirings 121 and touch location sensing wirings (not shown in FIG. 10)), a second insulating layer 19, a plurality of touch location detection electrodes 11 (including a plurality of mutual-capacitance touch location detection drive electrodes 111 and a plurality of touch location detection sensing electrodes 112) and a protective layer 17 on the emergent light side of the display module 300 and along the emergent light direction of the display module 300. The first insulating layer 16 is provided with a plurality of first via holes 163, and the touch location wiring 12 reused as the signal line 22 of the pressure-sensitive touch unit 21 is electrically connected with the corresponding pressure-sensitive touch unit 21 via a first via hole 163 (in FIG. 10, exemplarily, the touch location drive wiring 121 is reused as the signal line 22 of the pressure-sensitive touch unit 21). The second insulating layer 19 is provided with a plurality of second via holes 191, and each of the touch location wirings 12 is electrically connected with a corresponding touch location detection electrode 11 via a second via hole 191. It needs to be noted that, in this embodiment of the disclosure, location relation of the film layers of the pressure-sensitive touch unit and touch location detection electrode is not limited. For example, the pressure-sensitive touch unit may also be provided on one side of the touch location detection electrode that is far from the display module; as shown in FIG. 11, the touch display panel includes a display module 300, and the display module 300 is successively provided with a plurality of touch location detection electrodes 11 (which include a plurality of mutual-capacitance touch location detection drive electrodes 111 and a plurality of touch location detection sensing electrodes 112), a first insulating layer 16, a plurality of touch location wirings 12 (which include touch location drive wirings 121 and touch location sensing wirings (not shown in FIG. 11)), a second insulating layer 19, a pressure-sensitive touch unit 21 and a protective layer 17 on the emergent light side of the display module 300 and along the emergent light direction of the display module 300. The first insulating layer 16 is provided with a plurality of first via holes 163, and each of the touch location wiring 12 is electrically connected with a corresponding touch location detection electrode 11 via a first via hole 163. The second insulating layer 19 is provided with a plurality of second via holes 191, and the touch location wiring 12 reused as the signal line of the pressure-sensitive touch unit 21 is electrically connected with the corresponding pressure-sensitive touch unit 21 via a second via hole 191 (in FIG. 11, exemplarily, the touch location drive wiring 121 is reused as the signal line 22 of the pressure-sensitive touch unit 21).

Figure 12:
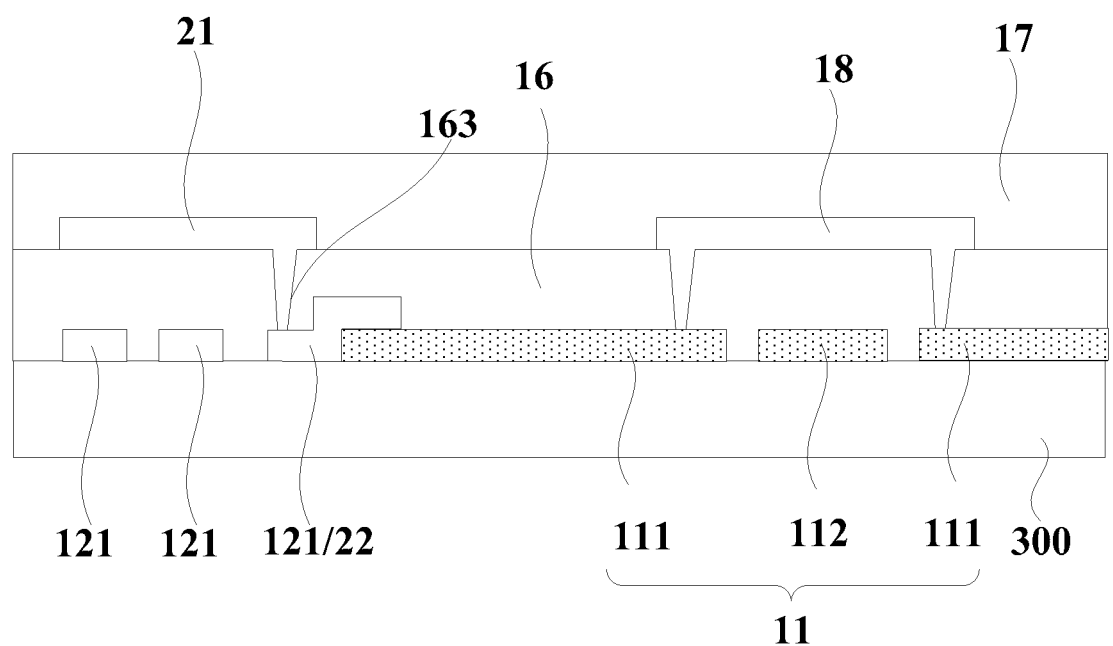
FIG. 12 is a schematic sectional view of another touch display panel according to an embodiment of the disclosure.

In one embodiment, no insulating layer may be provided between the film layer of the touch location wiring and the film layer of the touch location detection electrode. That is, each of the touch location wirings directly contacts and is electrically connected with the corresponding touch location detection electrode. FIG. 12 is a structural representation of another touch display panel according to an embodiment of the disclosure. As shown in FIG. 12, the touch display panel includes a display module 300, and the display module 300 is successively provided with a plurality of touch location detection electrodes 11 (including a plurality of mutual-capacitance touch location detection drive electrodes 111 and a plurality of touch location detection sensing electrodes 112), a plurality of touch location wirings 12 (including touch location drive wirings 121 and touch location sensing wirings (not shown in FIG. 12)), a first insulating layer 16, a pressure-sensitive touch unit 21 and a protective layer 17 on the emergent light side of the display module 300 and along the emergent light direction of the display module. The first insulating layer 16 is provided with a plurality of first via holes 163, and the touch location wiring 12 reused as the signal line 22 of the pressure-sensitive touch unit 21 is electrically connected with the corresponding pressure-sensitive touch unit 21 via a first via hole 163 (in FIG. 12, exemplarily, the touch location drive wiring 121 is reused as the signal line 22 of the pressure-sensitive touch unit 21).

Figure 13:
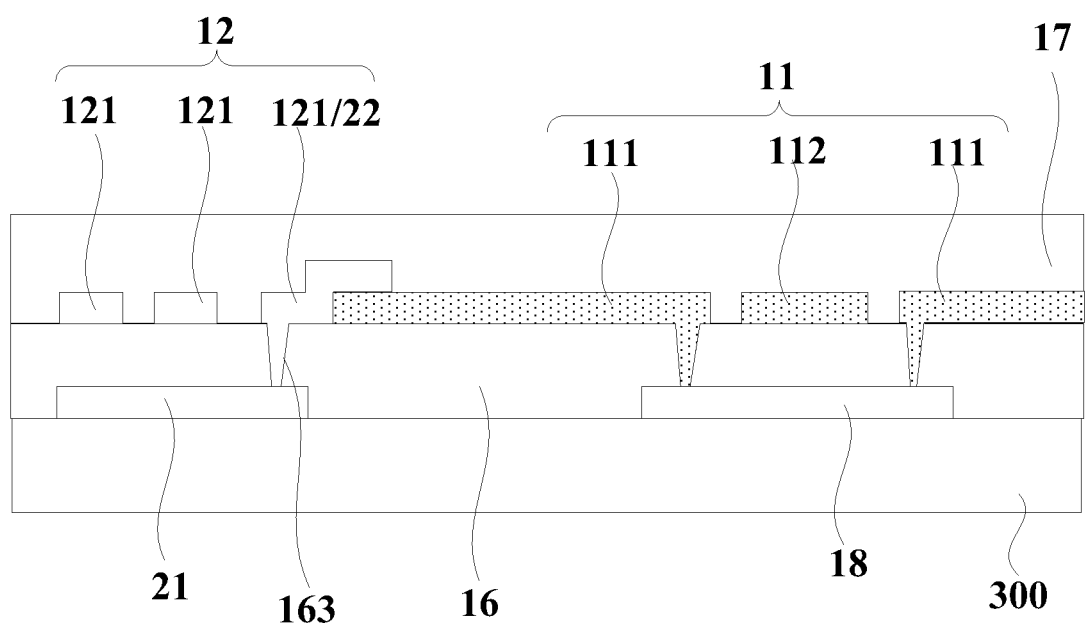
FIG. 13 is a schematic sectional view of another touch display panel according to an embodiment of the disclosure.

FIG. 13 is a structural representation of another touch display panel according to an embodiment of the disclosure. As shown in FIG. 13, the touch display panel includes a display module 300. The display module 300 is successively provided with a pressure-sensitive touch unit 21, a first insulating layer 16, a plurality of touch location wirings 12 (which includes touch location drive wirings 121 and touch location sensing wiring (not shown in FIG. 13)), a plurality of touch location detection electrodes 11 (which includes a plurality of mutual-capacitance touch location detection drive electrodes 111 and a plurality of touch location detection sensing electrodes 112) and a protective layer 17 on the emergent light side of the display module 300 and along the emergent light direction of the display module 300. The first insulating layer 16 is provided with a plurality of first via holes 163, and the touch location wiring 12 reused as the signal line 22 of the pressure-sensitive touch unit 21 is electrically connected with the corresponding pressure-sensitive touch unit 21 via a first via hole 163 (in FIG. 13, exemplarily, the touch location drive wiring 121 is reused as the signal line 22 of the pressure-sensitive touch unit 21).

In one embodiment, the bridging structure 18 in FIG. 8-FIG. 11 may be provided on the same layer as the touch location wiring 12, and the bridging structure 18 in FIG. 12 and FIG. 13 may be provided on the same layer as the pressure-sensitive touch unit 21. By such a configuration, the bridging structure 18 and the touch location wiring 12, or the bridging structure 18 and the pressure-sensitive touch unit 21, may be made of the same material in the same process, so that during the manufacturing process, only one etching process is needed, and there is no need to separately make mask plates, and hence the cost may be saved, the number of manufacture processes may be reduced, and the production efficiency may be improved.

Figure 14:
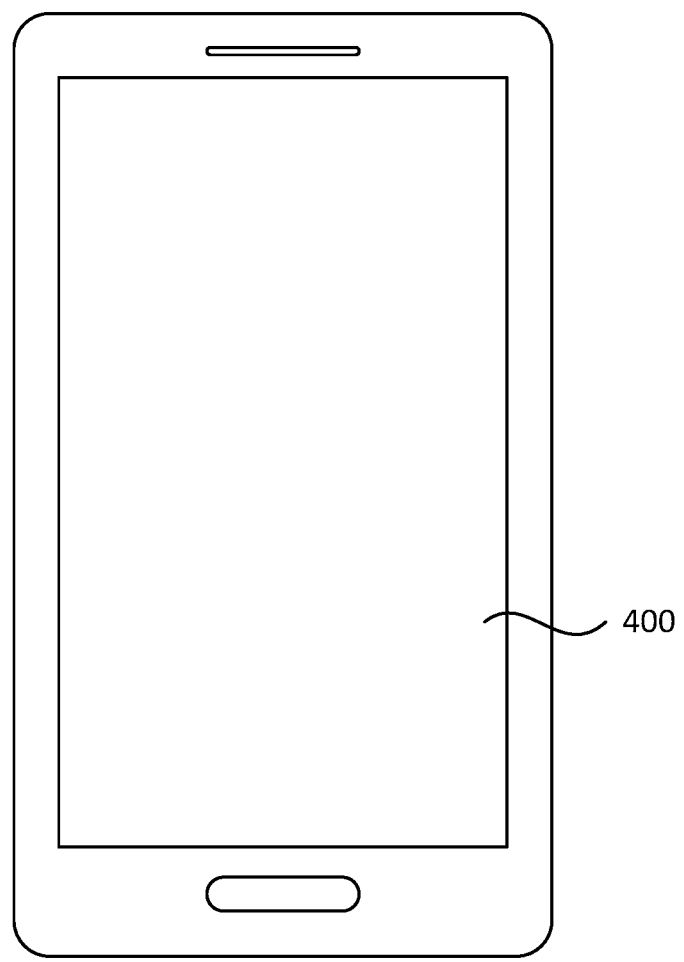
FIG. 14 is a structural representation of a touch display device according to an embodiment of the disclosure.

The disclosure further provides a touch display device. FIG. 14 is a structural representation of a touch display device according to an embodiment of the disclosure. As shown in FIG. 14, the touch display device includes a touch display panel 400 according to the above embodiments. It needs to be noted that, in this embodiment of the disclosure, the touch display device provided may further include other circuits and apparatuses configured to support the normal operation of the touch display device, and the above touch display device may be one of a mobile phone, a tablet computer, an electronic paper and an electronic photo frame.

The disclosure further provides a drive method for the touch display panel according to each of the above embodiments, and each drive cycle of the touch display panel includes at least one pressure-sensitive detection stage, and the drive method according to an embodiment of the disclosure includes: reusing, in the pressure-sensitive detection stage, at least one of the touch location wirings as a signal line of the pressure-sensitive touch unit, and the pressure-sensitive touch unit is configured to detect the magnitude of the touch pressure.

By the touch display panel according to this embodiment of the disclosure, not only touch location detection may be realized, but also touch pressure detection may be realized.

Because at least one of the touch location wirings is reused as a signal line of the pressure-sensitive touch unit, touch pressure detection and touch location detection may be performed in a time division mode, and in the pressure-sensitive detection stage, at least one of the touch location wirings is reused as a signal line of the pressure-sensitive touch unit, and the pressure-sensitive touch unit is configured to detect the magnitude of the touch pressure. Because the touch location wiring is reused as the signal line of the pressure-sensitive touch unit, the number of wirings in the non-display region of the touch display panel may be reduced, and it is favorable to reduce the size of the frame of the touch display panel.

In one embodiment, if the plurality of touch location detection electrodes include a plurality of self-capacitance touch location detection electrode blocks, in the drive method according to an embodiment of the disclosure, each drive cycle of the touch display panel further includes at least one display stage and at least one touch location detection stage. In this embodiment of the disclosure, in the touch location detection stage, the touch location may be detected by detecting a change in capacitances of the self-capacitance touch location detection electrode block; and in the pressure-sensitive detection stage, the pressure-sensitive touch unit is configured to detect the magnitude of the touch pressure.

In one embodiment, the display region is provided with a plurality of mutual-capacitance touch location detection sensing electrodes and a plurality of mutual-capacitance touch location detection drive electrodes, the touch location wirings includes touch location drive wirings and touch location sensing wirings, the mutual-capacitance touch location detection sensing electrode is electrically connected with the corresponding touch location sensing wiring, and the mutual-capacitance touch location detection drive electrode is electrically connected with the corresponding touch location drive wiring, so that in the drive method according to an embodiment of the disclosure, each drive cycle of the touch display panel further includes at least one display stage and at least one touch location detection stage. In this embodiment of the disclosure, in the touch location detection stage, the touch location may be detected by detecting a change of capacitances between the plurality of mutual-capacitance touch location detection sensing electrodes and the plurality of mutual-capacitance touch location detection drive electrodes; and in the pressure-sensitive detection stage, the pressure-sensitive touch unit is configured to detect the magnitude of the touch pressure.

In one embodiment, based on each of the above embodiments, the frequency of the signal used in the pressure-sensitive detection stage may be different from the frequency of the signal used in touch location detection stage. By such a configuration, signal interference between the circuits corresponding to the pressure-sensitive detection stage and the touch location detection stage may be avoided.

In one embodiment, in each of the above embodiments, each drive cycle may be the time period for which the touch display panel displays each of frames. In other embodiments, the relation between the drive cycle of the touch display panel and the time period for which the touch display panel displays each of frames may be designed according to the touch location and the touch pressure detection sensitivity. For example, each drive cycle may correspond to the time period for which the touch display panel displays n frames, and n is a positive integer greater than one.

Figure 15:
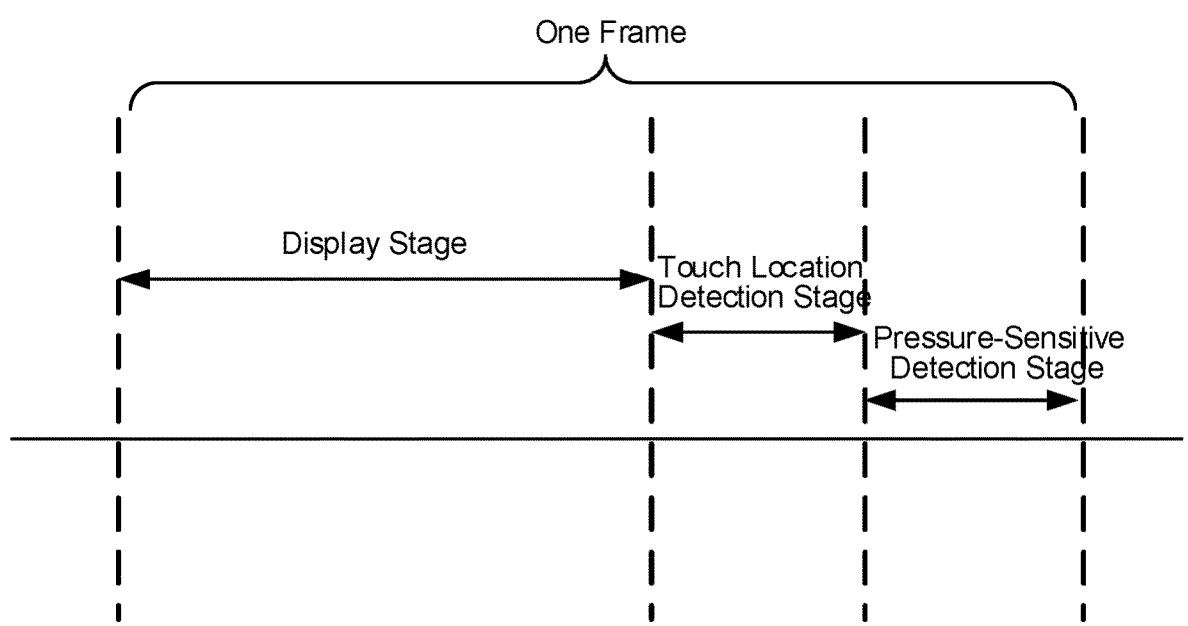
FIG. 15 is a schematic diagram showing a drive cycle according to an embodiment of the disclosure.

FIG. 15 is a schematic diagram showing a drive cycle according to an embodiment of the disclosure. As shown in FIG. 15, each drive cycle corresponds to the time period for which the touch display panel displays each of frames, and each drive cycle includes a display stage, a touch location detection stage and a pressure-sensitive detection stage. In FIG. 15, exemplarily, touch location detection is performed first, and then pressure-sensitive detection is performed. But the embodiments of the disclosure are not limited hereto, and in other embodiments, pressure-sensitive detection may be performed first, and then touch location detection is performed.

Figure 16:
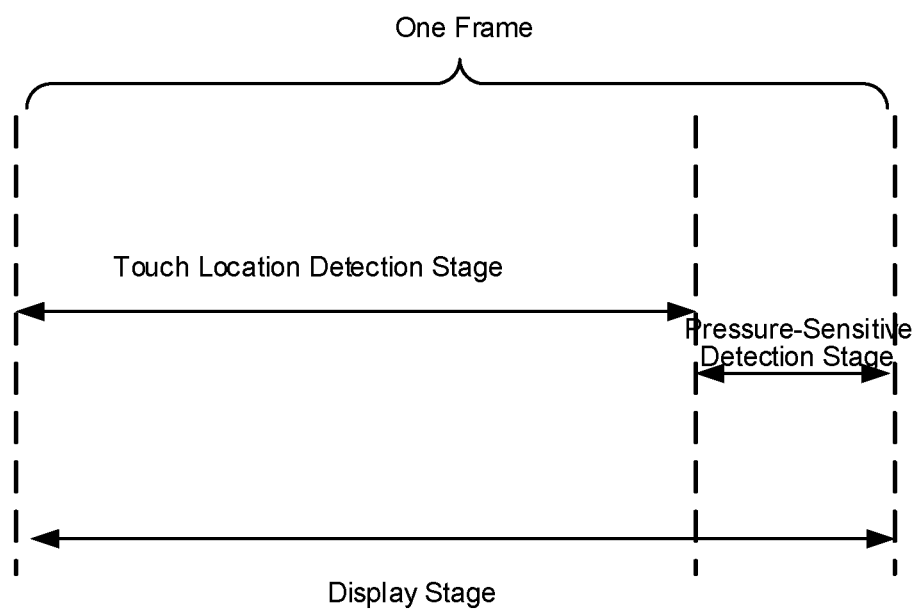
FIG. 16 is a schematic diagram showing another drive cycle according to an embodiment of the disclosure.

FIG. 16 is a schematic diagram showing another drive cycle according to an embodiment of the disclosure. As shown in FIG. 16, each drive cycle corresponds to the time period for which the touch display panel displays each frame, and each drive cycle includes a display stage, a touch location detection stage and a pressure-sensitive detection stage, and a part of the display stage and the touch location detection stage are performed simultaneously, and also, a part of the display stage and the pressure-sensitive detection stage are performed simultaneously. In each drive cycle of the touch display panel, the time length of the display stage is the same as that of each frame, and the touch location detection stage and the pressure-sensitive detection stage are performed in a time division mode, moreover, the sum of the time length of the touch location detection stage and the time length of the pressure-sensitive detection stage is the same as the time length of each frame. In FIG. 16, exemplarily, touch location detection is performed first, and then pressure-sensitive detection is performed. But the embodiments of the disclosure are not limited hereto, and in other embodiments, pressure-sensitive detection may be performed first, and then touch location detection is performed.

Figure 17:
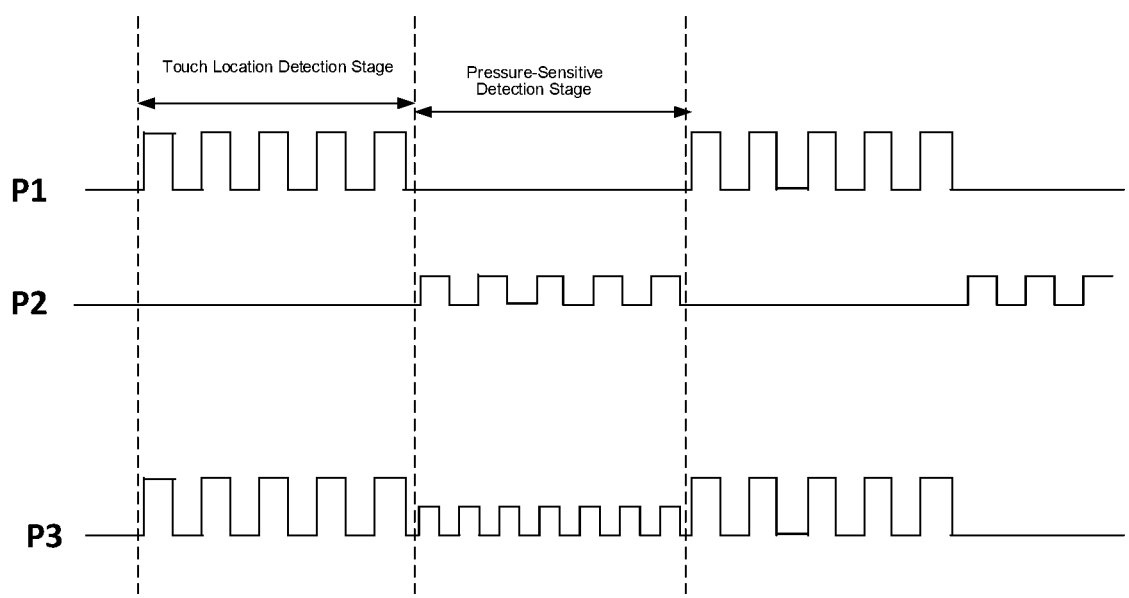
FIG. 17 is diagram showing a comparison in drive timings between the prior art and the present disclosure.

FIG. 17 is a diagram showing a driving sequence comparison between the prior art and the present disclosure. Referring to FIG. 17, a mutual-capacitance touch detection is taken as an example. One of the touch location drive wirings in the touch display panel is reused as a power input signal line of the pressure-sensitive touch unit. In the prior art, a power signal is provided to the pressure-sensitive touch unit in the pressure-sensitive detection stage by additionally providing a power input signal line (for example, the first power input signal line $V_{cc1}$ in the above embodiments) in the non-display region of the touch display panel. In FIG. 17, P1 represents a touch location drive wiring in the prior art, P2 represents a power input signal line of the pressure-sensitive touch unit in the prior art, and P3 represents a touch location drive wiring reused as a power input signal line of the pressure-sensitive touch unit in the embodiments of the disclosure. In the prior art, the touch location drive wiring P1 provides a touch drive signal to the mutual-capacitance touch location detection drive electrode in the touch location detection stage to realize touch location detection, but no signal is provided in the pressure-sensitive detection stage. The power input signal line P2 of the pressure-sensitive touch unit does not provide any signal in the touch location detection stage, but provides a power signal to the pressure-sensitive touch unit in the pressure-sensitive detection stage to realize touch pressure detection. In this embodiment of the disclosure, the touch location drive wiring P3 reused as the power input signal line of the pressure-sensitive touch unit provides a touch drive signal to the mutual-capacitance touch location detection drive electrode in the touch location detection stage to realize touch location detection, and also it provides a power signal to the pressure-sensitive touch unit in the pressure-sensitive detection stage to realize touch pressure detection. Therefore, it may be seen from FIG. 17 that, the touch location drive wiring P3 reused as the power input signal line of the pressure-sensitive touch unit is time-division reused, so that it not only provides a touch drive signal to the mutual-capacitance touch location detection drive electrode in the touch location detection stage but also provides a power signal to the pressure-sensitive touch unit in the pressure-sensitive detection stage.

It should be noted that the embodiments of the present disclosure and the technical principles used therein are described as above. It should be appreciated that the disclosure is not limited to the particular embodiments described herein, and any apparent alterations, modification and substitutions can be made without departing from the scope of protection of the invention. Accordingly, while the disclosure is described in detail through the above embodiments, the disclosure is not limited to the above embodiments and can further include other additional embodiments without departing from the concept of the invention.

What is claimed is:

1. A touch display panel, comprising:
a display region; and
a non-display region surrounding the display region;
wherein the non-display region is provided with at least one pressure-sensitive touch unit and the display region is provided with a plurality of touch location detection electrodes;
wherein the touch display panel further comprises a plurality of touch location wirings and a connection wire, one end of each of the touch location wirings is electrically connected with a corresponding touch location detection electrode of the plurality of touch location detection electrodes, and the other end of the each of the touch location wirings is directly electrically connected to a drive chip;
wherein one end of the connection wire is connected with one of the touch location wirings reused as a signal line of a pressure-sensitive touch unit of the at least one pressure-sensitive touch unit, the other end of the connection wire is connected with the pressure-sensitive touch unit;
wherein the connection wire and a connection point disposed between the connection wire and the one of the touch location wirings reused as the signal line of the pressure-sensitive touch unit are both located in the non-display region;
wherein the plurality of touch location wirings comprise touch location drive wirings and touch location sensing wirings, one touch location drive wiring of the touch location drive wirings reused as a signal line of a first pressure-sensitive touch unit of the at least one pressure-sensitive touch unit is configured to provide an input signal to the first pressure-sensitive touch unit and one touch location sensing wiring of the touch location sensing wirings reused as a signal line of a second pressure-sensitive touch unit of the at least one pressure-sensitive touch unit is configured to provide an output signal to the second pressure-sensitive touch unit, so that the first and second pressure-sensitive touch units can detect the magnitude of the touch pressure, wherein the one touch location drive wiring and the one touch location sensing wiring are electrically connected to different pressure-sensitive touch units; and
wherein in a pressure-sensitive detection stage, the one of the touch location wirings is reused as the signal line of the pressure-sensitive touch unit, and the pressure-sensitive touch unit is configured to detect the magnitude of the touch pressure.

2. The touch display panel as claimed in claim 1, wherein the plurality of touch location detection electrodes comprise a plurality of mutual-capacitance touch location detection drive electrodes and a plurality of mutual-capacitance touch location detection sensing electrodes;
the mutual-capacitance touch location detection sensing electrode is electrically connected with a corresponding touch location sensing wiring, and the mutual-capacitance touch location detection drive electrode is electrically connected with a corresponding touch location drive wiring; and
in a touch location detection stage, a touch location is detected by detecting a change in capacitances between the plurality of mutual-capacitance touch location detection sensing electrodes and the plurality of mutual-capacitance touch location detection drive electrodes.

3. The touch display panel as claimed in claim 1, wherein the pressure-sensitive touch unit renders a form of a block, a shape thereof is a polygon including at least four sides, and the pressure-sensitive touch unit is made of a semiconductor material;
the signal line of the pressure-sensitive touch unit comprises a first power input signal line, a second power input signal line, a first induction signal measuring signal line and a second induction signal measuring signal line;
the first power input signal line is electrically connected with a first connection terminal of the pressure-sensitive touch unit, the second power input signal line is electrically connected with a second connection terminal of the pressure-sensitive touch unit, the first induction signal measuring signal line is electrically connected with a third connection terminal of the pressure-sensitive touch unit, and the second induction signal measuring signal line is electrically connected with a fourth connection terminal of the pressure-sensitive touch unit; the first connection terminal, the second connection terminal, the third connection terminal and the fourth connection terminal are respectively located on the four sides of the polygon, the side where the first connection terminal is located is not connected with the side where the second connection terminal is located, and the side where the third connection terminal is located is not connected with the side where the fourth connection terminal is located.

4. The touch display panel as claimed in claim 3, wherein in the pressure-sensitive detection stage, at least a part of the touch location wirings are reused as the first power input signal line of the pressure-sensitive touch unit.

5. The touch display panel as claimed in claim 1, wherein the pressure-sensitive touch unit comprises a first pressure-sensitive resistor, a second pressure-sensitive resistor, a third pressure-sensitive resistor and a fourth pressure-sensitive resistor;
the signal line of the pressure-sensitive touch unit comprises a first power input signal line, a second power input signal line, a first induction signal measuring signal line and a second induction signal measuring signal line;
a first end of the first pressure-sensitive resistor and a first end of the second pressure-sensitive resistor are connected with the first power input signal line, a second end of the first pressure-sensitive resistor and a first end of the fourth pressure-sensitive resistor are connected with the first induction signal measuring signal line, a second end of the fourth pressure-sensitive resistor and a second end of the third pressure-sensitive resistor are connected with the second power input signal line, and a first end of the third pressure-sensitive resistor and a second end of the second pressure-sensitive resistor are connected with the second induction signal measuring signal line.

6. The touch display panel as claimed in claim 1, wherein the connection wire and the pressure-sensitive touch unit both are located on the same layer and are made of the same material.

7. The touch display panel as claimed in claim 1, wherein if one of the touch location wirings is reused as a first signal line of the pressure-sensitive touch unit and another one of the touch location wirings is reused as a second signal line, the resistance value between the first signal line and the second signal line is greater than 100 KΩ.

8. The touch display panel as claimed in claim 1, wherein the touch display panel is provided as a touch liquid crystal display panel or a touch OLED display panel.

9. The touch display panel as claimed in claim 1, wherein the pressure-sensitive touch unit and the plurality of touch location detection electrodes are provided on the same layer.

10. The touch display panel as claimed in claim 1, wherein
the plurality of touch location wirings are located between a film layer of the pressure-sensitive touch unit and a film layer of the plurality of touch location detection electrodes, and a first insulating layer is provided between the plurality of touch location wirings and the film layer of the pressure-sensitive touch unit, and a second insulating layer is provided between the plurality of touch location wirings and the film layer of the plurality of touch location detection electrodes;
the first insulating layer is provided with a plurality of first via holes, and the touch location wiring reused as the signal line of the pressure-sensitive touch unit is electrically connected with the corresponding pressure-sensitive touch unit by the first via hole; and also, the second insulating layer is provided with a plurality of second via holes, and each of the touch location wirings is electrically connected with the corresponding touch location detection electrode by a second via hole.

11. The touch display panel as claimed in claim 1, wherein
the plurality of touch location wirings are located between a film layer of the pressure-sensitive touch unit and a film layer of the plurality of touch location detection electrodes, and a first insulating layer is provided between the plurality of touch location wirings and the film layer of the pressure-sensitive touch unit;
the first insulating layer is provided with a plurality of first via holes, and the touch location wiring reused as the signal line of the pressure-sensitive touch unit is electrically connected with the corresponding pressure-sensitive touch unit by the first via hole; and each of the touch location wirings directly contacts and is electrically connected with the corresponding touch location detection electrode.

12. A touch display device, comprising a touch display panel, which comprises:
a display region; and
a non-display region surrounding the display region;
wherein the non-display region is provided with at least one pressure-sensitive touch unit and the display region is provided with a plurality of touch location detection electrodes;
wherein the touch display panel further comprises a plurality of touch location wirings and a connection wire, one end of each of the touch location wirings is electrically connected with a corresponding touch location detection electrode of the plurality of touch location detection electrodes, and the other end of the each of the touch location wirings is directly electrically connected to a drive chip;
wherein one end of the connection wire is connected with one of the touch location wirings reused as a signal line of a pressure-sensitive touch unit of the at least one pressure-sensitive touch unit, the other end of the connection wire is connected with the pressure-sensitive touch unit;
wherein the connection wire and a connection point disposed between the connection wire and the one of the touch location wirings reused as the signal line of the pressure-sensitive touch unit are both located in the non-display region;
wherein the plurality of touch location wirings comprise touch location drive wirings and touch location sensing wirings, one touch location drive wiring of the touch location drive wirings reused as a signal line of a first pressure-sensitive touch unit of the at least one pressure-sensitive touch unit is configured to provide an input signal to the first pressure-sensitive touch unit and one touch location sensing wiring of the touch location sensing wirings reused as a signal line of a second pressure-sensitive touch unit of the at least one pressure-sensitive touch unit is configured to provide an output signal to the second pressure-sensitive touch unit, so that the first and second pressure-sensitive touch units can detect the magnitude of the touch pressure, wherein the one touch location drive wiring and the one touch location sensing wiring are electrically connected to different pressure-sensitive touch units; and
wherein in a pressure-sensitive detection stage, the one of the touch location wirings is reused as the signal line of the pressure-sensitive touch unit, and the pressure-sensitive touch unit is configured to detect the magnitude of the touch pressure.

13. A drive method for a touch display panel,
wherein the touch display panel comprises aa display region; and
a non-display region surrounding the display region;
wherein the non-display region is provided with at least one pressure-sensitive touch unit and the display region is provided with a plurality of touch location detection electrodes;
wherein the touch display panel further comprises a plurality of touch location wirings and a connection wire, one end of each of the touch location wirings is electrically connected with a corresponding touch location detection electrode of the plurality of touch location detection electrodes, and the other end of the each of the touch location wirings is directly electrically connected to a drive chip;
wherein one end of the connection wire is connected with one of the touch location wirings reused as a signal line of a pressure-sensitive touch unit of the at least one pressure-sensitive touch unit, the other end of the connection wire is connected with the pressure-sensitive touch unit;

wherein the connection wire and a connection point disposed between the connection wire and the one of the touch location wirings reused as the signal line of the pressure-sensitive touch unit are both located in the non-display region;

wherein the plurality of touch location wirings comprise touch location drive wirings and touch location sensing wirings, one touch location drive wiring of the touch location drive wirings reused as a signal line of a first pressure-sensitive touch unit of the at least one pressure-sensitive touch unit is configured to provide an input signal to the first pressure-sensitive touch unit and one touch location sensing wiring of the touch location sensing wirings reused as a signal line of a second pressure-sensitive touch unit of the at least one pressure-sensitive touch unit is configured to provide an output signal to the second pressure-sensitive touch unit, so that the first and second pressure-sensitive touch units can detect the magnitude of the touch pressure, wherein the one touch location drive wiring and the one touch location sensing wiring are electrically connected to different pressure-sensitive touch units; and wherein in a pressure-sensitive detection stage, the one of the touch location wirings is reused as the signal line of the pressure-sensitive touch unit, and the pressure-sensitive touch unit is configured to detect the magnitude of the touch pressure, and wherein each drive cycle of the touch display panel comprises at least one pressure-sensitive detection stage, and the drive method comprises:

reusing, in the pressure-sensitive detection stage, the one of the touch location wirings as the signal line of the pressure-sensitive touch unit, wherein the pressure-sensitive touch unit is configured to detect the magnitude of the touch pressure.

14. The drive method as claimed in claim 13, wherein each drive cycle of the touch display panel further comprises at least one display stage and at least one touch location detection stage;

the display region is provided with a plurality of mutual-capacitance touch location detection sensing electrodes and a plurality of mutual-capacitance touch location detection drive electrodes;

the touch location wirings comprise touch location drive wirings and touch location sensing wirings;

the mutual-capacitance touch location detection sensing electrode is electrically connected with a corresponding touch location sensing wiring, and the mutual-capacitance touch location detection drive electrode is electrically connected with a corresponding touch location drive wiring;

in the touch location detection stage, a touch location is detected by detecting a change in capacitances between the plurality of mutual-capacitance touch location detection sensing electrodes and the plurality of mutual-capacitance touch location detection drive electrodes;

wherein, a frequency of a signal used in the pressure-sensitive detection stage is different from a frequency of a signal used in the touch location detection stage.

15. The drive method as claimed in claim 13, wherein each of the drive cycles corresponds to a time period for which the touch display panel display each of frames.

* * * * *